United States Patent [19]
Kubitza et al.

[11] Patent Number: 5,985,986
[45] Date of Patent: Nov. 16, 1999

[54] PROCESS FOR THE PREPARATION OF COATINGS FROM MOISTURE-CURING COATING COMPOSITIONS

[75] Inventors: Werner Kubitza, Leverkusen; Rolf Roschu, Willich; Ferdinand Zöllner, Leverkusen; Hans Josef Laas, Cologne, all of Germany

[73] Assignee: Bayer Aktiengesellschaft, Leverkusen, Germany

[21] Appl. No.: 08/318,328

[22] Filed: Oct. 5, 1994

Related U.S. Application Data

[63] Continuation of application No. 08/009,522, Jan. 27, 1993, abandoned.

[30] Foreign Application Priority Data

May 2, 1992 [DE] Germany ............................ 42 03 217

[51] Int. Cl.$^6$ ................ C08J 3/00; C08K 3/20; C08L 75/00; B05D 1/36
[52] U.S. Cl. .................. 524/591; 427/372.2; 427/385.5; 427/407.1; 524/839; 524/840
[58] Field of Search .................... 524/591, 839, 524/840; 427/407.1, 372.2, 385.5

[56] References Cited

U.S. PATENT DOCUMENTS

| | | | |
|---|---|---|---|
| 3,428,592 | 2/1969 | Youker | 260/29.2 |
| 4,663,377 | 5/1987 | Hombach et al. | 524/196 |
| 5,075,370 | 12/1991 | Kubitza et al. | 524/591 |

FOREIGN PATENT DOCUMENTS

| | | |
|---|---|---|
| 2055419 | 5/1992 | Canada . |
| 013112 | 7/1980 | European Pat. Off. . |
| 516277 | 12/1992 | European Pat. Off. . |
| 1444933 | 8/1976 | United Kingdom . |
| 2018796 | 10/1979 | United Kingdom . |

OTHER PUBLICATIONS

Kunststoff Handbuch (Plastics Handbook), vol. 7, "Polyurethane" ("Polyurethanes"), Carl Hanser Verlag Munich/Vienna (1983), pp. 545 et seq.

Cyanamid, "Aqueous Polyurethane Dispersions from TMXDI (Meta) Aliphatic Isocyanate" Feb. 1989.

*Primary Examiner*—Patrick D. Niland
*Attorney, Agent, or Firm*—Joseph C. Gil; Thomas W. Roy

[57] ABSTRACT

The present invention relates to a process for the preparation of a coating by
a) applying to a water-resistant substrate an aqueous coating composition containing water and a binder which consists essentially of at least one hydrophilically-modified organic polyisocyanate or polyisocyanate mixture which has an NCO content of 5 to 30, preferably 10 to 23% by weight, and is dispersible in water and
b) curing the composition in the presence of moisture to form a polyurea coating.

18 Claims, No Drawings

PROCESS FOR THE PREPARATION OF COATINGS FROM MOISTURE-CURING COATING COMPOSITIONS

This application is a continuation of application Ser. No. 08/009,522 filed Jan. 27, 1993 now abandoned.

BACKGROUND OF THE INVENTION

1. Field of the Invention

The present invention relates to a novel process for the preparation of coatings on water-resistant substrates using an aqueous coating composition wherein the binder consists essentially of a hydrophilically modified, water-dispersible polyisocyanate having free isocyanate groups.

2. Description of the Prior Art

Compositions containing polyisocyanates having free NCO groups or isocyanate prepolymers have been known for a long time. They cure in the presence of moisture to form N-substituted polyurea compounds. Such products form the basis of one-component polyurethane coating technology (cf. e.g. Kunststoff Handbuch (Plastics Handbook), Volume 7, "Polyurethane" ("Polyurethanes"), Carl Hanser Verlag Munich/Vienna (1983), pages 545 et seq.).

Binders for the one-component compositions may be based on prepolymers prepared by reacting difunctional to polyfunctional isocyanate compounds with difunctional and/or polyfunctional alcohols. The NCO/OH equivalent ratio used for the preparation of the prepolymers is selected so that the prepolymers are soluble in organic solvents and also still contain free NCO groups. After application to a substrate, the NCO groups react with atmospheric moisture to provide crosslinked polyurea coatings. This produces films with a high crosslinking density and, thus, a high level of properties.

Conventional polyisocyanates derivatives, such as those generally used as crosslinking components in two-component polyurethane coating compositions, can be used for these applications, provided that they possess the property spectrum demanded by the market. These polyisocyanates derivatives may contain urethane, isocyanurate, uretdione, biuret and/or allophanate groups.

Because the NCO prepolymers and many of the polyisocyanate derivatives have viscosities of greater than 2000 mPa.s at room temperature, they require the addition of organic solvents to obtain a viscosity suitable for formulating and processing. Obviously, the higher the viscosity of the polyisocyanate derivative or NCO prepolymer, the greater the amount of solvent which must be added to obtain the necessary viscosity. For ecological and safety reasons (fire hazards), the use of coating compositions containing organic solvents is continually decreasing in practice. They are being increasingly replaced with aqueous coating compositions for coating a very wide variety of substrates.

The use of organic polyisocyanates having free isocyanate groups analogously to solvent-containing one-component systems as binders for aqueous lacquers has previously not seemed possible because these binders cure in the presence of moisture and there is an excessive supply of water in these aqueous compositions. Accordingly, it would not be expected to be possible to prepare aqueous compositions based on polyisocyanates having free isocyanate groups as essentially the only binder component.

The fact that aqueous two-component polyurethane coating compositions have been disclosed does not affect the preceding conclusion because, in the two-component systems, certain polyhydroxyl compounds are preferably used in combination with hydrophobic polyisocyanates. Therefore, it is possible to assume that the polyisocyanate is to some extent enveloped by the organic polyhydroxyl compound to prevent a reaction between the free isocyanate groups and water, which forms the continuous phase of the emulsions.

Surprisingly, however, it has now been found that certain hydrophilically-modified polyisocyanates or polyisocyanate mixtures, which are described in greater detail below, are excellent binders for aqueous coating compositions and provide a processing time which is sufficiently long for practical purposes.

SUMMARY OF THE INVENTION

The present invention relates to a process for the preparation of a coating by a) applying to a water-resistant substrate an aqueous coating composition containing water and a binder which consists essentially of at least one hydrophilically-modified organic polyisocyanate or polyisocyanate mixture which has an NCO content of 5 to 30, preferably 10 to 23% by weight, and is dispersible in water and b) curing the composition in the presence of moisture to form a polyurea coating.

DETAILED DESCRIPTION OF THE INVENTION

The binder component is selected from hydrophilically-modified polyisocyanates or mixtures thereof. It is possible to use mixtures of hydrophilically-modified polyisocyanates and hydrophilically-unmodified polyisocyanates, provided that the hydrophilicity of the hydrophilically-modified polyisocyanate is sufficiently high to render the mixture dispersible with water.

The preferred polyisocyanates or polyisocyanate mixtures have a viscosity at 23° C. of 40 to 10,000 mPa.s, preferably 100 to 5000 mPa.s; an (average) NCO functionality of 1.8 to 5, preferably 2 to 4; an NCO content of 5 to 30%, preferably 10 to 23% by weight and more preferably 12 to 21.5% by weight; and a content of ethylene oxide units (calculated as $C_2H_4O$, molecular weight=44) present within polyether chains of 1 to 20%, preferably 2 to 20% and more preferably 3 to 17% by weight. The NCO groups are preferably those bonded to aliphatic or cycloaliphatic carbon atoms, more preferably to aliphatic carbon atoms.

The hydrophilically modified polyisocyanates are prepared according to known methods by reacting suitable starting polyisocyanates with less than stoichiometric amounts of monohydric or polyhydric polyether alcohols having polyether chains containing at least 70 mole percent, preferably at least 80 mole percent, of ethylene oxide units.

Suitable starting polyisocyanates for preparing the hydrophilically modified polyisocyanates preferably have an (average) NCO functionality of 2.1 to 4.4, more preferably 2.3 to 4.2, and exclusively contain (cyclo)aliphatically bound isocyanate groups. Examples of these starting polyisocyanates are polyisocyanate derivatives prepared by modifying monomeric (cyclo)aliphatic diisocyanates to introduce uretdione, isocyanurate, urethane, allophanate, biuret and/or oxadiazine trione groups according to the processes described, e.g., in DE-OS 1,678,666, 3,700,209 and 3,900,053 and EPA 336,205 or 339,396.

Suitable diisocyanates for the preparation of the polyisocyanate derivatives are those which have a molecular weight of 140 to 400 and contain (cyclo)aliphatically bound isocyanate groups. Examples include 1,4-diisocyanatobutane, 1,6-diisocyanatohexane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1-isocyanato-3,3,5-trimethyl-5-isocyanatomethylcyclohexane (isophorone diisocyanate), 4,4'-diisocyanatodicyclohexylmethane and mixtures of these diisocyanates.

Preferred starting components for the preparation of the hydrophilically-modified polyisocyanates are polyisocyanate mixtures having an NCO content of 19 to 24% by weight and containing the isocyanurate trimer 1,6-diisocyanatohexane and the isocyanurate dimer of 1,6-diisocyanatohexane. Another preferred starting component is a polyisocyanate having an NCO content of 19 to 24% by weight which contains the isocyanurate trimer 1,6-diisocyanatohexane but does not contain the uretdione dimer. This polyisocyanate preferably has an average NCO functionality of 3.2 to 4.2.

Suitable hydrophilic polyether alcohols for preparing the hydrophilically-modified polyisocyanates include those prepared by the alkoxylation monohydric or polyhydric starter molecules, preferably having a molecular weight of 32 to 150. Examples of suitable starter molecules are monohydric alcohols such as methanol, n-butanol, cyclohexanol and 3-methyl-3-hydroxymethyloxetane. Less preferred are polyhydric starter molecules such as water, ethylene glycol, propylene glycol, glycerol and trimethylolpropane. The alkoxylation reaction is carried out using ethylene oxide or a mixture of ethylene oxide with other alkylene oxides, preferably propylene oxide, provided that the polyether chains contain at least 70 mole percent, preferably at least 80 mole percent, of ethylene oxide units.

The amount of the alkylene oxides is selected so that the resulting polyether alcohols have a statistical average of at least one polyether chain containing at least 5, preferably at least 6 ethylene oxide units per molecule. In general, the polyether alcohols have 6 to 70, preferably 6 to 40 and more preferably 6 to 9, ethylene oxide units in the form of polyether chains. Particularly preferred polyether alcohols are pure polyethylene glycol monomethyl ether alcohols having a statistical average of 6.0 to 9.0 ethylene oxide units per molecule.

The polyisocyanates are rendered hydrophilic by reacting the starting polyisocyanates with the polyether alcohols to from urethane groups in amounts such that the resulting polyisocyanates or polyisocyanate mixtures satisfy the parameters previously set forth. The NCO/OH equivalent ratio for this reaction is preferably from 4:1 to 120:1, more preferably 6:1 to 100:1. The reaction is preferably carried out at a temperature of 20 to 120° C., preferably 40 to 100° C., and can be regarded as complete when the theoretical NCO content has been reached.

The coating compositions according to the invention also contain water. Based on 100 parts by weight of the polyisocyanate, the aqueous compositions contain 2 to 400, preferably 10 to 100, parts by weight of water. Depending upon the amounts of polyisocyanate and water and on the constitution of the polyisocyanate, the compositions can either be water-in-oil or oil-in-water emulsions. Because the incorporation of hydrophilic polyether chains into the polyisocyanate generally provides sufficient emulsifying power, the emulsions can be prepared simply by mixing the starting components without the addition of other additives to facilitate the emulsification process.

If the coating composition used according to the invention is essentially a water-in-oil emulsion, a homogeneous film free of defects is formed directly during the evaporation of the water and cures within a few hours in the presence of moisture to form substituted polyurea compounds. Initially, the moisture is residual moisture from the emulsion and subsequently is atmospheric moisture.

The same applies in the case of an oil-in-water emulsion, except that during the evaporation of the water the polyisocyanate particles initially flow together and then coalesce to form a film.

In both cases the equipment can easily be cleaned with water. In the case of a water-in-oil emulsion the polyisocyanate is sufficiently hydrophilic and in the case of an oil-in-water emulsion the continuous phase is water.

Even though some of the NCO groups react upon contact with water, i.e., prior to application, this reaction is sufficiently slow to allow a pot life of up to 2.5 hours for the freshly prepared coating compositions.

The coating compositions according to the invention are water-dilutable polyisocyanate formulations which can be adjusted to the desired processing consistency with the appropriate amount of water prior to application and which cure under the effect of moisture to provide films primarily containing polyurea segments. The property level of the cured films correspond to that of conventional moisture-curing, one-component polyurethane systems containing organic solvents.

If appropriate, the coating compositions used in the process according to the invention can contain other auxiliary agents and additives c), especially pigments. Pigmented compositions can be prepared by the pigment dispersion processes conventionally used for both aqueous systems and non-aqueous systems. Thus the pigment may be dispersed in the polyisocyanate component using drying agents such as those conventionally used in polyurethane coatings technology, e.g., p-toluylsulphonyl monoisocyanate (which is available as Additive TI from Bayer AG, Leverkusen).

On the other hand, it is possible to formulate the pigment as an aqueous "pigment grinding" (i.e., a slurry in an aqueous solution of thickener and, if appropriate, pigment wetting agents) and to homogenize it with the polyisocyanate component shortly before processing.

Examples of other auxiliary agents and additives which may be incorporated are solvents which are inert towards isocyanate groups such as aromatic hydrocarbons. The solvents can be used to dissolve other additives or to lower the viscosity of the polyisocyanate prior to preparation of the aqueous emulsion. However, the maximum proportion of solvents is 5% by weight, based on the total weight of the coating compositions.

Examples of other auxiliary agents and additives are known and include catalysts for the $NCO/H_2O$ reaction (such as dibutyltin dilaurate), flow-control agents, antifoaming agents, fillers and levelling agents.

The coating compositions may be applied by conventional methods of coating technology such as spraying, dipping, brushing, etc. Examples of suitable substrates include concrete, floor plaster, wood, glass, various metals and plastics.

After the application of the coating compositions, e.g. in wet film thicknesses of 100 to 200 μm, the water begins to evaporate and a uniform transparent film is formed. After 30 to 60 minutes at RT, the evaporation of the water is essentially complete and the matrix has reached a constant weight.

Atmospheric moisture is then available for curing in the same manner as with conventional solvent-containing, moisture-curing, one-component polyurethane coating compositions.

Depending upon the reactivity of the polyisocyanate and any reaction accelerators used, the coatings obtained are set-to-touch within 0.5 to 8 hours and dry-to-handle within 4 to 24 hours.

In a particular embodiment of the process according to the invention decorative coatings can be produced using sand of various grain sizes, including coloured or decorative sand and/or grit or decorative grit and/or expanded clay granules or similar granulated minerals with grain sizes of up to 10 mm and/or plastic granules as component c), optionally in addition to other auxiliaries and additives c). Such decorative coatings can be applied to suitable substrates in layers of up to several centimeters and can be used for example for producing concrete floor finishes, swimming pool rims and anti-slip finishes for steps, ramps or working platforms.

For this purpose the hydrophilic polyisocyanate a) is based in considerably subequivalent amounts and serves as a binder for the granules. For the production of suitable coating compositions the hydrophilic polyisocyanate is diluted to the required consistency with water, mixed with the granules and optionally other auxiliaries and additives and is then applied to the substrate to be coated. Where the substrates are absorbent, a transparent, non-filled prime coating based on the same binder can be applied to optimise adhesion.

For the above application the concentration of the hydrophilic polyisocyanate a) in the aqueous binder solution is generally from 30 to 90, and preferably from 60 to 80% by weight. Generally from 2 to 20, and preferably from 2 to 10 parts by weight of polyisocyanate solids are used per 100 parts by weight of the abovementioned fillers.

After the coating has hardened the same binder can for example be used for the final sealing of the surface.

The invention is further illustrated but is not intended to be limited by the following examples in which all parts and percentages are by weight unless otherwise specified.

EXAMPLES

The following polyisocyanates are used in the examples below:

Polyisocyanate A:

A polyisocyanate prepared from 1,6-diisocyanatohexane and having isocyanurate groups, an NCO content of 21.5% by weight, an average NCO functionality of 3.8 and a viscosity of 3000 mPa.s (23° C.). This hydrophilically unmodified polyisocyanate was only used in admixture with polyisocyanate B.

Polyisocyanate B:

0.08 equivalents of a methanol-initiated monofunctional polyethylene oxide polyether having an average molecular weight of 350 was added with stirring to 1.0 equivalent of polyisocyanate A at room temperature and the mixture was then heated at 100° C. for 3 h. Cooling to room temperature provided a practically colorless, clear polyisocyanate mixture according to the invention. The NCO content was 17.3%, the content of ethylene oxide units was 11.3% and the viscosity was 3050 mPa.s (23° C.).

Example 1

200 parts by weight of water were carefully stirred with 9 parts by weight of a commercially available dispersant (Disperbyk 182, Byk, Wesel) and 300 parts by weight of a commercially available ground and mixed pigment (SICOMIX grey RAL 7032, BASF AG, Ludwigshafen) were then added to this mixture. Dispersion was then carried out by means of a Dissolver for 30 minutes at a speed of rotation of 15 to 20 m/sec. Glass beads were added to the mixture to facilitate the dispersion process. After sieving and cooling, 2 parts by weight of a commercially available antifoaming agent (Byk 023, Byk, Wesel) and 9 parts by weight of a 20% by weight solution of a commercially available polyurethane thickener (Acrysol RM 8, Rohm und Haas, Frankfurt) were added to this formulation and the mixture was stirred. This provided the base component for a water-dilutable two-component coating system of practically unlimited storage stability. 400 parts by weight of polyisocyanate B mixed with 8 parts by weight of a 10% by weight catalyst solution (i.e., dibutyltin dilaurate, Akzo, Düren, dissolved in Solvesso 100 solvent) were added to the base component to form a water-dilutable coating composition according to the invention which had the following composition:

| | |
|---|---|
| Polyisocyanate B, solid | 43.2% by weight |
| Additives | 1.4% by weight |
| Pigment | 32.4% by weight |
| Water | 22.2% by weight |
| Solvent | 0.8% by weight |
| Total | 100.0% by weight |
| Total solids | 77% by weight |

If desired, the compositions can be adjusted to the desired processing viscosity with water. Organic solvents are not necessary for this purpose.

The composition, which contained less than 1% by weight of organic solvent, was applied to glass plates in a wet film thickness of 200 μm (which corresponds to a dry film thickness of 80 to 90 μm). The dried film had a silky gloss and was free from defects. The curing process was complete after 10 to 14 days. The coating compositions and the resulting film had the following properties:

| | |
|---|---|
| Gel time: | 1.5 to 2 h |
| Surface drying (sand): | 4 to 8 h |
| Thorough drying (tack-free): | 8 to 24 h |
| Optical effect: | good (silky gloss) |
| Pendulum hardness (Albert/König): | 120 s |
| Solvent resistance | |
| White spirit: | very good |
| Solvent naphtha 100: | very good |
| Methoxybutyl acetate: | very good |
| Acetone: | very good |
| Ethanol: | very good |

A coating composition was prepared as described above, ventilated for 30 minutes at room temperature and cured by forced heat for 1 hour at 140° C. in the presence of moisture (dish of water). The coating had the following properties:

| | |
|---|---|
| Optical effect: | good (silky gloss) |
| Pendulum hardness: | 90 to 100 s |
| Solvent resistance | |
| White spirit: | very good |
| Solvent naphtha 100: | very good |

-continued

| | |
|---|---|
| Methoxybutyl acetate: | very good |
| Acetone: | very good |
| Ethanol: | very good |

Example 2

200 parts by weight of water were carefully stirred with 9 parts by weight of a commercially available dispersant (Disperbyk 182, Byk, Wesel) and 300 parts by weight of a commercially available ground and mixed pigment (SICOMIX grey RAL 7032, BASF AG, Ludwigshafen) were then added to this mixture. Dispersion was then carried out by means of a Dissolver for 30 minutes at a speed of rotation of 15 to 20 m/sec. Glass beads were added to the mixture to facilitate the dispersion process. After sieving and cooling, 2 parts by weight of a commercially available antifoaming agent (Byk 023, Byk, Wesel) and 9 parts by weight of a 20% by weight solution of a commercially available polyurethane thickener (Acrysol RM 8, Rohm und Haas, Frankfurt) were added to this formulation and the mixture was stirred. This provided the base component for a water-dilutable two-component coating system of practically unlimited storage stability. 200 parts by weight of polyisocyanate A and 200 parts by weight of polyisocyanate B mixed with 8 parts by weight of a 10% by weight catalyst solution (i.e., dibutyltin dilaurate, Akzo, Düren, dissolved in Solvesso 100 solvent) were added to the base component to form a water-dilutable coating composition according to the invention which had the following composition:

| | |
|---|---|
| Polyisocyanate A/B | 43.2% by weight |
| Additives | 1.4% by weight |
| Pigment | 32.4% by weight |
| Water | 22.2% by weight |
| Solvent | 0.8% by weight |
| Total | 100.0% by weight |
| Total solids | 77% by weight |

If desired, the compositions can be adjusted to the desired processing viscosity with water. Organic solvents are not necessary for this purpose.

The composition, which contained less than 1% by weight of organic solvent, was applied to glass plates in a wet film thickness of 200 μm (which corresponds to a dry film thickness of 80 to 90 μm). The dried film had a silky gloss and was free from defects. The curing process was complete after 10 to 14 days. The coating compositions and the resulting film had the following properties:

| | |
|---|---|
| Gel time: | 2 to 2.5 h |
| Surface drying (sand): | 8 to 24 h |
| Thorough drying (tack-free): | 24 to 32 h |
| Optical effect (gloss): | good (silky gloss) |
| Pendulum hardness (Albert/König): | 140 s |
| Solvent resistance | |
| White spirit: | very good |
| Solvent naphtha 100: | very good |
| Methoxybutyl acetate: | very good |
| Acetone: | very good |
| Ethanol: | very good |

A coating composition was prepared as described above, ventilated for 30 minutes at room temperature and cured by forced heat for 1 hour at 140° C. in the presence of moisture (dish of water). The coating had the following properties:

| | |
|---|---|
| Optical effect: | good (silky gloss) |
| Pendulum hardness: | 90 to 100 s |
| Solvent resistance | |
| White spirit: | very good |
| Solvent naphtha 100: | very good |
| Methoxybutyl acetate: | very good |
| Acetone: | good |
| Ethanol: | very good |

Example 3

100 parts by weight of polyisocyanate B were mixed with 40 parts by weight of a commercially available pigment (Bayertitan R-KB-4, Bayer AG, Leverkusen). For long-term stabilization, 4 parts by weight of a commercially available drying agent (Additive TI, toluylsulphonyl monoisocyanate, Bayer AG, Leverkusen) were also added. The mixture was then homogenized by means of a Dissolver for 30 minutes at a speed of rotation of 15 to 20 m/sec. After sieving and cooling, 2 parts by weight of a 10% by weight catalyst solution (i.e., dibutyltin dilaurate, Akzo, Düren, dissolved in Solvesso 100 solvent) were added to the formulation to provide a water-dilutable formulation of practically unlimited storage stability. The addition and homogenization of 60 parts by weight of water immediately prior to processing resulted in a water-dilutable coating composition according to the invention which had the following composition:

| | |
|---|---|
| Polyisocyanate B | 48.5% by weight |
| Additives | 2.0% by weight |
| Pigment | 19.5% by weight |
| Water | 29.1% by weight |
| Solvent | 0.9% by weight |
| Total | 100.0% by weight |
| Total solids | 70.0% by weight |

If desired, the compositions can be adjusted to the desired processing viscosity with water. Organic solvents are not necessary for this purpose.

The composition, which contained less than 1% by weight of organic solvent, was applied to glass plates in a wet film thickness of 200 μm (which corresponds to a dry film thickness of 70 to 80 μm). The dried film was glossy and free from defects. The curing process was complete after 10 to 14 days. The coating compositions and the resulting film had the following properties:

| | |
|---|---|
| Gel time: | 2.5 h |
| Surface drying (sand): | 4 to 8 h |
| Thorough drying (tack-free): | 8 to 24 h |
| Optical effect (gloss): | very good (gloss) |
| Pendulum hardness (Albert/König): | 130 s |
| Solvent resistance | |
| White spirit: | very good |
| Solvent naphtha 100: | very good |
| Methoxybutyl acetate: | very good |
| Acetone: | very good |
| Ethanol: | very good |

A coating composition was prepared as described above, ventilated for 30 minutes at room temperature and cured by forced heat for 1 hour at 140° C. in the presence of moisture (dish of water). The coating had the following properties:

| Optical effect: | very good |
|---|---|
| Pendulum hardness: | 80 to 90 s |
| Solvent resistance | |
| White spirit: | very good |
| Solvent naphtha 100: | very good |
| Methoxybutyl acetate: | very good |
| Acetone: | very good |
| Ethanol: | very good |

Example 4

100 parts by weight of polyisocyanate B were mixed with 7.0 parts by weight of a commercially available flatting agent (Deuteron MK, Schöner, Achim) and 3.3 parts by weight of a commercially available wetting additive (Deuterol 201 E, Schöner, Achim). For long-term stabilization, 1 part by weight of a commercially available drying agent (Additive TI, toluylsulphonyl monoisocyanate, Bayer AG, Leverkusen) was also added. The mixture was then homogenized by means of a high-speed stirrer for 15 minutes at a speed of rotation of 5 to 10 m/sec. After sieving and cooling, 2 parts by weight of a 10% by weight catalyst solution (i.e., dibutyltin dilaurate, Akzo, Düren, dissolved in Solvesso 100 solvent) were added to the formulation to provide a water-dilutable formulation of practically unlimited storage stability. The addition and homogenization of 44 parts by weight of water immediately prior to processing resulted in a water-dilutable coating composition according to the invention which had the following composition:

| Polyisocyanate B | 63.5% by weight |
|---|---|
| Additives | 2.8% by weight |
| Flatting agent | 4.5% by weight |
| Water | 28.0% by weight |
| Solvent | 1.2% by weight |
| Total | 100.0% by weight |
| Total solids | 70.8% by weight |

If desired, the compositions can be adjusted to the desired processing viscosity with water. Organic solvents are not necessary for this purpose.

The composition, which contained less than 1.2% by weight of organic solvent, was applied to glass plates in a wet film thickness of 200 μm (which corresponds to a dry film thickness of 70 to 80 μm). The dried film was glossy and free from defects. The curing process was complete after 10 to 14 days. The coating compositions and the resulting film had the following properties:

| Gel time: | 2.5 h |
|---|---|
| Surface drying (sand): | 4 to 8 h |
| Thorough drying (tack-free): | 8 to 24 h |
| Optical effect (gloss): | good (silky matt) |
| Pendulum hardness (Albert/König): | 110 to 120 s |
| Solvent resistance | |
| White spirit: | very good |
| Solvent naphtha 100: | very good |
| Methoxybutyl acetate: | very good |
| Acetone: | very good |
| Ethanol: | very good |

A coating composition was prepared as described above, ventilated for 30 minutes at room temperature and cured by forced heat for 1 hour at 140° C. in the presence of moisture (dish of water). The coating had the following properties:

| Optical effect: | good (silky matt) |
|---|---|
| Pendulum hardness: | 140 to 150 s |
| Solvent resistance | |
| White spirit: | very good |
| Solvent naphtha 100: | very good |
| Methoxybutyl acetate: | very good |
| Acetone: | very good |
| Ethanol: | very good |

Example 5

100 parts by weight of polyisocyanate B are admixed with 0.3 parts by weight of dibutyl-tin-dilaurate. This mixture is subsequently admixed with 40 parts by weight of water and, thereafter, with 1200 parts by weight of expanded clay granules having a particle size of from 3 to 5 mm. Finally the mixture thus obtained is applied on an open air concrete surface at a layer thickness of 3 cm. The coated surfaces thus obtained can be walked on after a hardening time of one day (dry autumn weather) and is completely hardened after one week.

Example 6

Example 5 is repeated with the following differences: 140.3 parts by weight of the binder solution containing catalyst in accordance with example 5 are admixed with 2300 parts by weight of decorative grit having a particle size of from 5 to 8 mm. The mixture thus obtained is applied on a concrete surface as described in Example 5. After a hardening time of one week a fully hardened decorative grit coating is obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a coating which comprises
   a) applying to a water-resistant substrate an aqueous coating composition containing water and only one binder which consists essentially of a hydrophilically-modified polyisocyanate component containing one or more hydrophilically-modified polyisocyanates which are dispersible in water, said hydrophilically-modified polyisocyanate component having a viscosity at 23° C. of 100 to 5000 mPa.s, an average NCO functionality of 2 to 4, a content of (cyclo)aliphatically bound isocyanate groups of 12 to 21.5% by weight, based on the weight of said hydrophilically modified polyisocyanate component, and a content of ethylene oxide units (calculated as $C_2H_4O$, molecular weight=44) present within polyether chains of 2 to 20% by weight, based on the weight of said hydrophilically modified polyisocyanate component, and
   b) curing said aqueous coating composition in the presence of moisture to form a polyurea coating.

2. The process of claim 1 wherein the aqueous coating composition is present in the form of an oil-in-water or a water-in-oil emulsion.

3. The process of claim 1 wherein 2 to 400 parts by weight of water are present per 100 parts by weight of said polyisocyanate component.

4. The process of claim 1 wherein the aqueous coating composition comprises one or more fillers selected from the group consisting of (i) sand, colored sand or decorative sand of various grain sizes, (ii) grit or decorative grit with a grain size of up to 10 mm, (iii) expanded clay granules with a grain size of up to 10 mm, and (iv) plastic granules of a grain size of up to 10 mm, wherein said fillers are present in an amount such that 2 to 20 parts by weight of binder a) are present per 100 parts by weight of said fillers.

5. The process of claim 1 wherein the aqueous coating composition contains a pigment.

6. The process of claim 5 wherein the aqueous coating composition additionally contains a water-dilutable pigment grinding agent.

7. A process for the preparation of a coating which comprises
   a) applying to a water-resistant substrate an aqueous coating composition containing water and only one binder which consists essentially of a polyisocyanate component containing one or more hydrophilically-modified polyisocyanates which are dispersible in water, said hydrophilically-modified polyisocyanate component having a viscosity at 23° C. of 100 to 5000 mPa.s, an average NCO functionality of 2 to 4, a content of (cyclo)aliphatically bound isocyanate groups of 12 to 21.5% by weight, based on the weight of said hydrophilically modified polyisocyanate component, and a content of ethylene oxide units (calculated as $C_2H_4O$, molecular weight=44) present within polyether chains of 2 to 20% by weight, based on the weight of said hydrophilically modified polyisocyanate component, said polyether chains containing 6 to 9 alkylene oxide units and
   b) curing said aqueous coating composition in the presence of moisture to form a polyurea coating.

8. The process of claim 7 wherein the aqueous coating composition is present in the form of an oil-in-water or a water-in-oil emulsion.

9. The process of claim 7 wherein 2 to 400 parts by weight of water are present per 100 parts by weight of said polyisocyanate component.

10. The process of claim 7 wherein the aqueous coating composition comprises one or more fillers selected from the group consisting of (i) sand, colored sand or decorative sand of various grain sizes, (ii) grit or decorative grit with a grain size of up to 10 mm, (iii) expanded clay granules with a grain size of up to 10 mm, and (iv) plastic granules of a grain size of up to 10 mm, wherein said fillers are present in an amount such that 2 to 20 parts by weight of binder a) are present per 100 parts by weight of said fillers.

11. The process of claim 7 wherein the aqueous coating composition contains a pigment.

12. The process of claim 11 wherein the aqueous coating composition additionally contains a water-dilutable pigment grinding agent.

13. A process for the preparation of a coating which comprises
   a) applying to a water-resistant substrate an aqueous coating composition containing water and only one binder which consists of a hydrophilically-modified polyisocyanate component containing one or more hydrophilically-modified polyisocyanates which are dispersible in water, said hydrophilically-modified polyisocyanate component having a viscosity at 23° C. of 100 to 5000 mPa.s, an average NCO functionality of 2 to 4, a content of (cyclo)aliphatically bound isocyanate groups of 12 to 21.5% by weight, based on the weight of said hydrophilically modified polyisocyanate component, and a content of ethylene oxide units (calculated as $C_2H_4O$, molecular weight=44) present within polyether chains of 2 to 20% by weight, based on the weight of said hydrophilically modified polyisocyanate component, and
   b) curing said aqueous coating composition in the presence of moisture to form a polyurea coating.

14. The process of claim 13 wherein the aqueous coating composition is present in the form of an oil-in-water or a water-in-oil emulsion.

15. The process of claim 13 wherein 2 to 400 parts by weight of water are present per 100 parts by weight of said polyisocyanate component.

16. The process of claim 13 wherein the aqueous coating composition comprises one or more fillers selected from the group consisting of (i) sand, colored sand or decorative sand of various grain sizes, (ii) grit or decorative grit with a grain size of up to 10 mm, (iii) expanded clay granules with a grain size of up to 10 mm, and (iv) plastic granules of a grain size of up to 10 mm, wherein said fillers are present in an amount such that 2 to 20 parts by weight of binder a) are present per 100 parts by weight of said fillers.

17. The process of claim 13 wherein the aqueous coating composition contains a pigment.

18. The process of claim 17 wherein the aqueous coating composition additionally contains a water-dilutable pigment grinding agent.

* * * * *